United States Patent
Karri et al.

(10) Patent No.: US 11,351,577 B1
(45) Date of Patent: Jun. 7, 2022

(54) PROTECTING THE DISPLAY OF A DEVICE WHEN CLEANING WITH A CLOTH/MATERIAL

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/204,596

(22) Filed: Mar. 17, 2021

(51) Int. Cl.
| | |
|---|---|
| B08B 13/00 | (2006.01) |
| B08B 1/00 | (2006.01) |
| G08B 7/06 | (2006.01) |
| G06F 16/245 | (2019.01) |
| B08B 7/02 | (2006.01) |

(52) U.S. Cl.
CPC ............ *B08B 1/007* (2013.01); *B08B 1/006* (2013.01); *B08B 7/028* (2013.01); *B08B 13/00* (2013.01); *G06F 16/245* (2019.01); *G08B 7/06* (2013.01)

(58) Field of Classification Search
None
See application file for complete search history.

(56) References Cited

U.S. PATENT DOCUMENTS

| | | | |
|---|---|---|---|
| 8,493,714 B2 | 7/2013 | Visser | |
| 8,587,542 B2 | 11/2013 | Moore | |
| 2014/0137348 A1 | 5/2014 | Lodge | |
| 2017/0225206 A1 | 8/2017 | Deitchman | |

FOREIGN PATENT DOCUMENTS

WO 2018040171 A1 3/2018

OTHER PUBLICATIONS

Anonymous, "How To Clean Your LCD Display—Advice From A Leading LCD Manufacturer," New Vision Display, Sep. 13, 2017, 4 pages, Retrieved from the Internet: <URL: https://newvisiondisplay.com/properly-clean-lcd-display-leading-lcd-manufacturer/>.
Mell, et al., "The NIST Definition of Cloud Computing", National Institute of Standards and Technology, Special Publication 800-145, Sep. 2011, 7 pages.

*Primary Examiner* — Eric W Golightly
(74) *Attorney, Agent, or Firm* — Samuel A. Waldbaum (57) ABSTRACT

A mobile device comprising: a display; a first sensor to detect a cloth approaching a surface of the display; an ultrasonic emitter to emit ultrasonic waves towards the cloth; a second sensor to track a pressure a user exerts on the surface of the display; and a processing unit to: determine if the material of the cloth is hard or soft; in response to the material being hard, alert the user that the cloth is not appropriate to clean the surface of the display; and alert the user that the entire display was not cleaned with the cloth.

10 Claims, 8 Drawing Sheets

PROTECTING THE DISPLAY OF A DEVICE WHEN CLEANING WITH A CLOTH/MATERIAL

BACKGROUND

The present invention relates generally to the field of mobile devices, and more particularly to utilizing an electronic cloth or cloth to clean a display screen of the mobile device.

On a periodic basis a display of a device needs to be cleaned to remove accumulated dust or dirt from the display. For example, dust can accumulate on the surface of the display of the mobile device and/or oils from the user finger (as he interacts with the display) can accumulate on the surface of the display. So, the display of the device needs to be periodically cleaned to give the best viewing experience for the user.

A user generally uses a cloth to clean the display surface, where the cleaning cloth is chosen from something that is readily available, for example, clothing, napkins, paper towel, etc. It is important to use a soft cloth because rough items like paper towels can cause scratches and potentially damage the display surface.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for cleaning a surface of a display on a mobile device.

A method for cleaning a display surface of a mobile device, detecting the approach of a cloth towards a surface of a display on a mobile device. Emitting ultrasonic waves towards the cloth to remove dust and dirt located on the cloth. Determining if the material of the cloth is hard or soft. In response to the material being hard, alerting the user that the cloth is not appropriate to clean the surface of the display. Tracking the pressure, the user exerts on the surface of the display and alerting the user that the entire display was not cleaned with the cloth.

A mobile device comprising a display and a first sensor to detect a cloth approaching a surface of the display. An ultrasonic emitter to emit ultrasonic waves towards the cloth. A processing unit to determine if the material of the cloth is hard or soft. In response to the material being hard, alerting the user that the cloth is not appropriate to clean the surface of the display. A second sensor to track the pressure the user exerts on the surface of the display and the processing unit to alert the user that the entire display was not cleaned with the cloth.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 1A and 1B is a functional block diagram illustrating a mobile device interaction with an electronic cloth or a cloth, in accordance with an embodiment of the present invention.

FIGS. 2A and 2B is a flowchart depicting operational steps of the mobile device interaction with the electronic cloth of FIG. 1, in accordance with an embodiment of the present invention.

FIG. 3 is a block diagram of components of a mobile device of the secure communication systems of FIG. 1, in accordance with embodiments of the present invention.

FIG. 4 is a block diagram of components of a computing device of the secure communication systems of FIG. 1, in accordance with embodiments of the present invention.

FIG. 5 depicts a cloud computing environment according to an embodiment of the present invention.

FIG. 6 depicts abstraction model layers according to an embodiment of the present invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for using normal cloth or an electronic cloth (e-cloth) to clean the surface of a display of the mobile device. The mobile device utilizes a sensor to detect a cloth as it approaches the display of the mobile device. The mobile device utilizes an ultrasonic emitter to clean the cloth or e-cloth. The ultrasonic waves will impact the surface of the cloth or e-cloth and bounce back towards the mobile device. The impacting waves will cause dust and dirt located on the surface of the cloth or e-cloth to become dislodged. The ultrasonic waves that bounce back from the cloth or e-cloth towards the mobile device are detected by a sensor. The mobile device detects the approaching cloth is an e-cloth by connecting to the electronics contained within the e-cloth. When the cloth approaching is not an e-cloth then the mobile device analyzes the returned ultrasonic waves (i.e., the waves that bounce back towards the mobile device during the cloth cleaning stage) to identify the type of material (hard or soft) of the cloth. The type of cloth (e.g., hard, or soft) can be determined by comparing the bounce back waves to a database. When the cloth is determined to be comprised of a hard material then the user is alerted that the material of the cloth is an inappropriate material for cleaning the surface of the display.

When the user is using an e-cloth to clean the display, the mobile device can receive data from the e-cloth about the material of the e-cloth. The mobile device determines if the material of the e-cloth is appropriate for cleaning the display. The data received from the e-cloth contains information about the properties of the material of the e-cloth and could contain information about the cleanliness level of the e-cloth (e.g., if the e-cloth has accumulated dust or dirt). The mobile device determines if the material of the e-cloth can hold a static charge. When the e-cloth can hold a static charge then the mobile device notifies the user to place the e-cloth at a desired location. Once the e-cloth is at the desired location than the mobile device activates the ultrasonic emitter to emit ultrasonic waves towards the desired location to build a static charge on the e-cloth. As the user cleans the surface of the display, then the static charge on the e-cloth attracts dust and dirt found on the surface of the display surface.

The mobile device monitors the user as he cleans the surface of the display with the cloth. The mobile device alerts the user if he is applying too much pressure while cleaning and alerts the user to areas of the display not cleaned by the cloth.

Figure 1A:
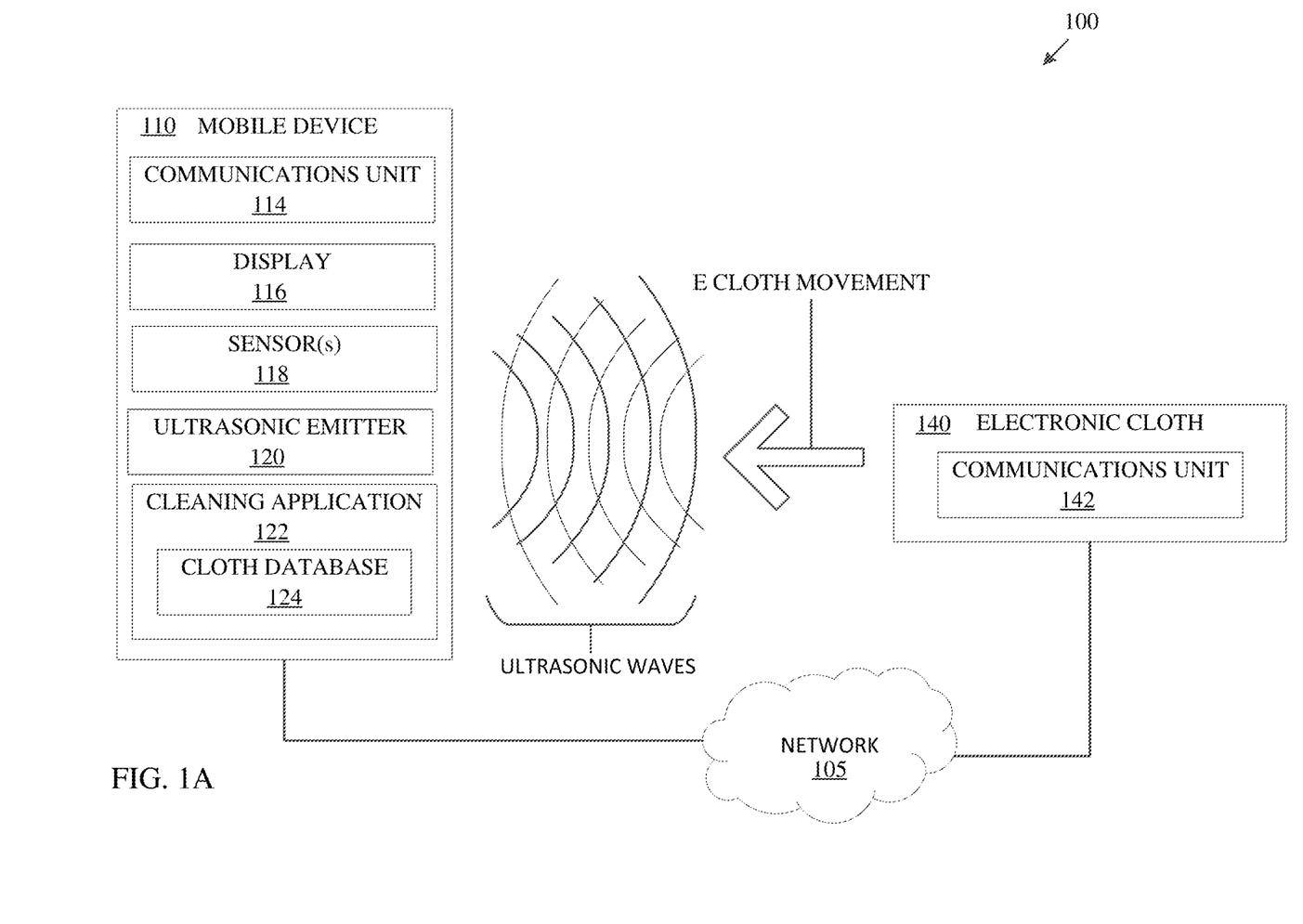
Figure 1B:
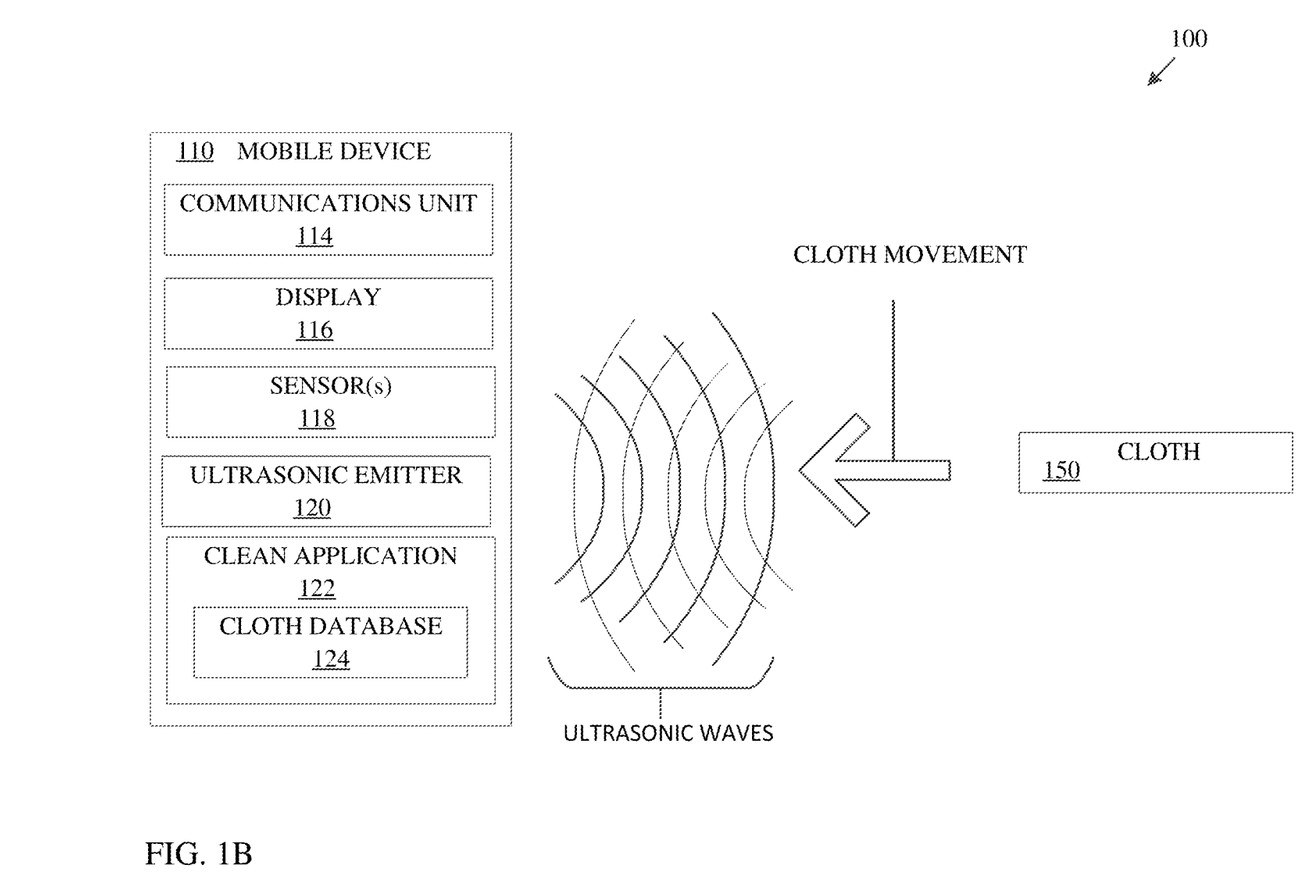

FIGS. 1A and 1B is a functional block diagram 100 illustrating a mobile device 110 interaction with an electronic cloth 140 or a cloth 150, in accordance with an embodiment of the present invention. The mobile device 110 in FIGS. 1A and 1B is the same, but FIG. 1A illustrates the uses of an electronic cloth 140 to clean the display 116 and FIG. 1B illustrates the use of a cloth 150 to clean the display 116. The description below can be applied to both FIGS. 1A and 1B.

Figure 5:
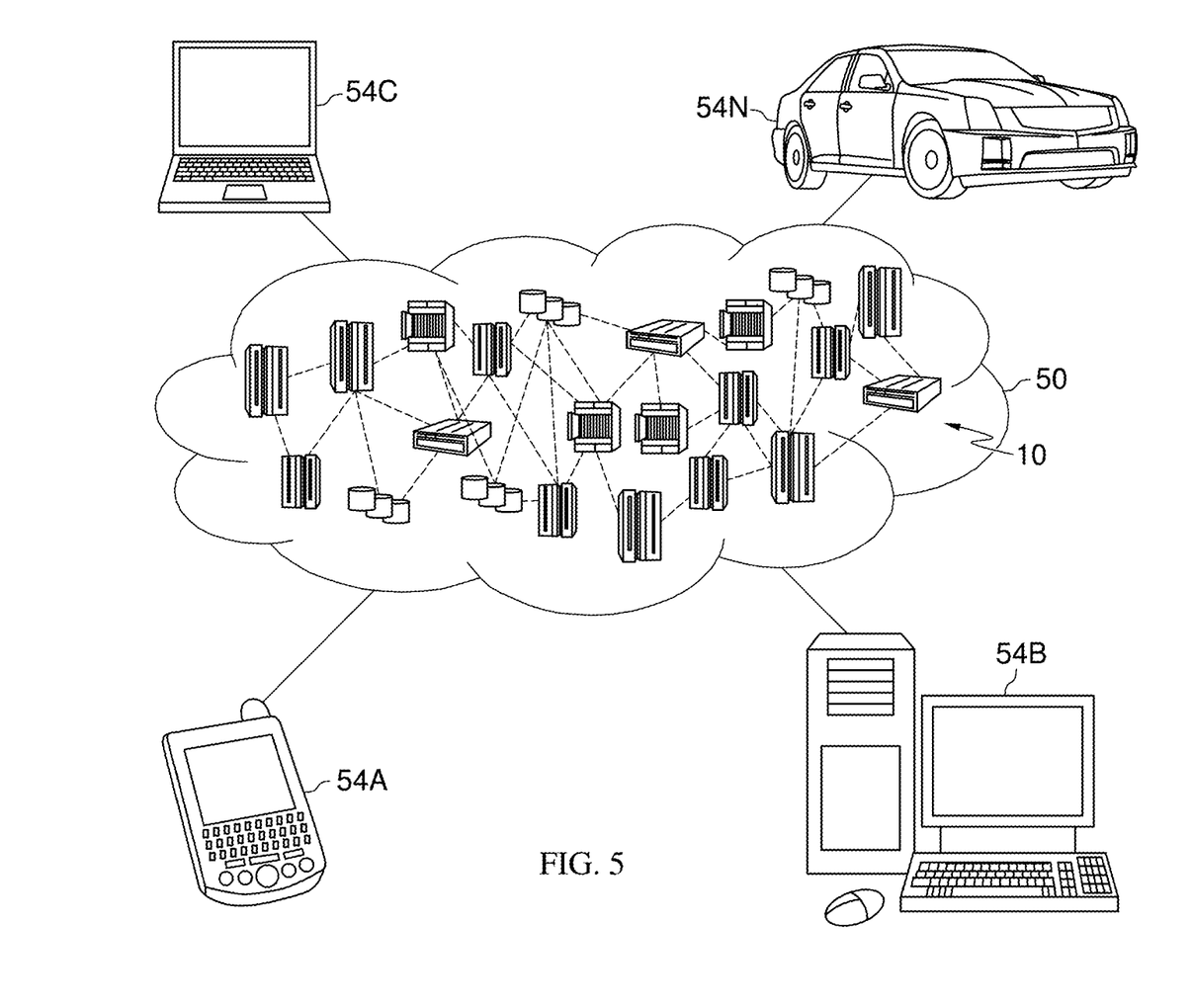
Figure 6:
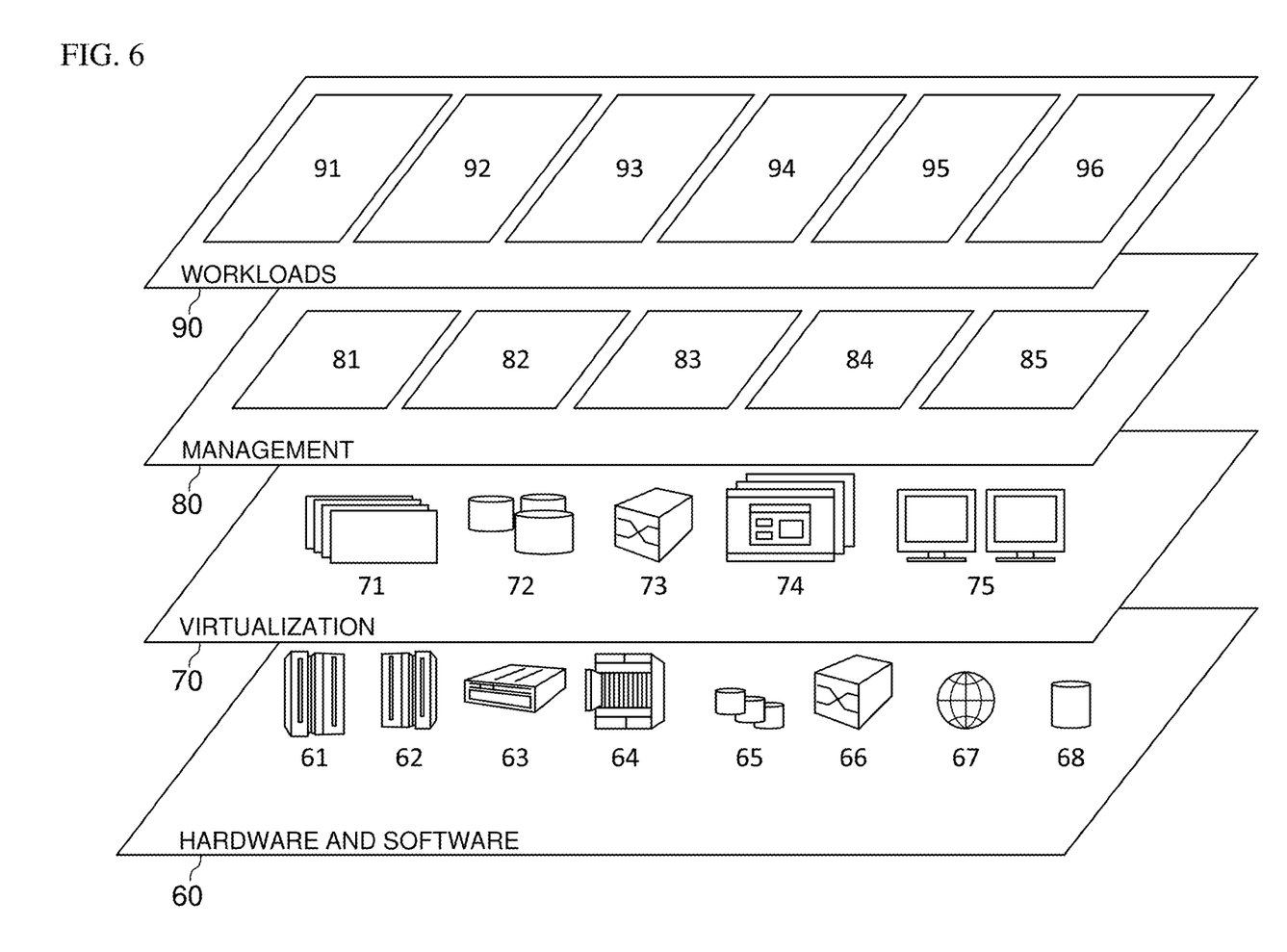

The mobile device 110 may be a laptop computer, tablet computer, netbook computer, personal computer (PC), a desktop computer, a personal digital assistant (PDA), a smart phone, or any programmable electronic device that includes a display 116 that a user will want to clean. Mobile device 110 may include internal and external hardware components, as depicted, and described in further detail below with reference to FIGS. 3 and 4, and operate in a cloud computing environment, as depicted in FIGS. 5 and 6.

Mobile device 110 includes a communications unit 114, a display 116, a sensor(s) 118, an ultrasonic emitter 120, and a cleaning application 122. The cleaning application may include cloth database 124. The communications unit 114 allows for the mobile device 110 to communicate over the network 105 with other devices. The communications unit 114 receives data from the communications unit 142 of the electronic cloth (e-cloth) 140.

Network 105 can be, for example, a local area network (LAN), a wide area network (WAN) such as the Internet, or a combination of the two, wireless communications between devices such as BLUETOOTH® communications, and can include wired, wireless, or fiber optic connections. In general, network 105 can be any combination of connections and protocols that will support communications between mobile device 110 and e-cloth 140.

The mobile device 110 includes a display 116 that can be an ordinary screen or a touchscreen. The display 116 attracts dust and dirt from the air during normal operations of the display 116, and in the case of the touchscreen the user finger transfers oil, dirt, and dust to surface of the display 116.

The sensor(s) 118 can be comprise of one or more sensors, such as proximity sensors, cameras, vibration sensors, pressure sensors, etc. The sensor(s) 118 detects when a cloth 150 or the e-cloth 140 approaches the display 116 of the mobile device 110. The sensor(s) 118 detects any ultrasonic waves that bounce back from the surface of the cloth 150 or the e-cloth 140. The sensor(s) 118 sends the data about the received ultrasonic waves to the cleaning application 122. The sensor(s) 118 detects the pressure the user applies to the surface of the display 116 as he cleans the surface of display 116. The sensor(s) 118 tracks the e-cloth 140 or cloth 150 movements based on the applied pressure. The ultrasonic emitter 120 emits ultrasonic waves to interact with the surface of the e-cloth 140 or cloth 150. The ultrasonic emitter 120 emit ultrasonic waves in the range of 20 KHz and 50 KHz.

The cleaning application 122 receives data from the sensor(s) 118 that indicates a cloth 150 or e-cloth 140 is approaching the surface of the display 116. The cleaning application 122 activates the ultrasonic emitter 120 to emit ultrasonic waves towards the cloth 150 or the e-cloth 140. The ultrasonic waves impact on the surface of the cloth 150 or e-cloth 140 causing dust and dirt to be removed from the impacted surface. The ultrasonic waves bounce back towards the mobile device 110 and are detected by the sensor(s) 118. The cleaning application 122 receives the data collected by sensor(s) 118 from ultrasonic waves bounced back from the cloth 150 or e-cloth 140. The cleaning application 122 includes a cloth database 124. The cloth database 124 is a datastore that contains information about different types of cloth materials. The cleaning application 122 determines if the cloth material is hard or soft by comparing the sensor data about the returned ultrasonic waves to the data stored in the cloth database 124. When the cleaning application 122 determines that the material of the cloth 150 is hard, then the cleaning application 122 alerts the user that he is about to use an inappropriate cloth 150 to clean the display 116. The alert can be an audio alert or a visual alert that is shown on the display 116.

In the situation of the user using a cloth 150 to clean the display, the cleaning application 122 activates the ultrasonic emitter 120 to emit ultrasonic waves towards the cloth 150. The ultrasonic waves impact the surface of the cloth 150 to remove dust and dirt and the ultrasonic waves bounce off the cloth 150 back towards the mobile device 110. The sensor(s) 118 detect the returning ultrasonic waves. The cleaning application 122 determines if the material of the cloth 150 is hard or soft by comparing the returned ultrasonic waves from the sensor(s) 118 to the data stored in the cloth database 124. When the cleaning application 122 determines that the material of the cloth 150 is hard, then the cleaning application 122 alerts the user that he is about to use an inappropriate cloth 150 to clean the display 116. The alert can be an audio alert or a visual alert that is shown on the display 116. When the cleaning application 122 determines that the cloth 150 is comprised of a soft material then the cleaning application 122 determines the cleanliness level of the cloth 150 based on the received data and the returned ultrasonic waves.

In the situation of the user using an e-cloth 140 to clean the display 116, then the mobile device 110 connects to the e-cloth 140, via network 105. The mobile device 110 receives data from the e-cloth 140, via the communications unit 114. The e-cloth 140 includes a communications unit 142 to connect to the mobile device 110, via the network 105. The communications unit 142 can transmit data about the e-cloth 140 to the mobile device 110. The received data from e-cloth 140 can contain information about the material of the e-cloth 140, the ability to hold a static charge, cleanliness level of the e-cloth (e.g., dirty or dusty), or other information. The cleaning application 122 determines if the material of the e-cloth 140 is hard or soft by comparing the received data from the e-cloth 140 to the data stored in the cloth database 124. When the cleaning application 122 determines that the material of the e-cloth 140 is hard, then the cleaning application 122 alerts the user that he is about to use an inappropriate e-cloth 140 to clean the display 116. The alert can be an audio alert or a visual alert that is shown on the display 116. When the cleaning application 122 determines that the e-cloth 140 is comprised of a soft material then the cleaning application 122 determines the cleanliness level of the e-cloth 140 based on the received data and the returned ultrasonic waves.

The cleaning application 122 determines the cleanliness level of the cloth 150 or the e-cloth 140. For example, the cleaning application 122 determines if the cloth 150 or e-cloth 140 is too dirty to clean the surface of the display 116. The cleaning application 122 determines the cleanliness of the cloth 150 or e-cloth 140 by comparing the sensor data about the bounce back ultrasonic waves to a cleanliness threshold value. The received data from the e-cloth 140 could also contain information about the cleanliness of the e-cloth 140 (e.g., if the e-cloth 140 accumulated dust or dirt). When the cleaning application 122 determines that the cloth 150 or e-cloth 140 is dirty, then the cleaning application 122 alerts the user that he is about to use a dirty cloth 150 or e-cloth 140 to clean the display 116. The alert can be an audio alert or a visual alert that is shown on the display 116. When the cleaning application 122 determines that the cleanliness level of the cloth 150 or the e-cloth 140 is acceptable, then the cleaning application 122 determines if the static charge stage should proceed.

The cleaning application 122 can alert the user that the e-cloth 140 can hold a static charge based on the data received from the e-cloth 140. Alternatively, when it is not known that the cloth 150 or e-cloth 140 will hold a static charge, then the cleaning application 122 can provide the user with an option of starting a static charge stage for the e-cloth 140 or cloth 150. When the user indicates that he wants to proceed with the static charge stage or the cleaning application determines that the e-cloth 140 can hold a static charge, then the cleaning application 122 displays a message on the display 116, where the message directs the user to hold the e-cloth 140 or cloth 150 at a predetermine location. The cleaning application 122 activates the ultrasonic emitter 120 to emit ultrasonic waves towards the predetermined location. The ultrasonic waves interact with the surface of the e-cloth 140 or cloth 150 to build a static charge. After a predetermined time, the cleaning application 122 turns off the ultrasonic emitter 120 and alerts the user that the static charge operation has been completed. While the user uses the cloth 150 or e-cloth 140 to clean the surface of the display 116, then the static charge on the e-cloth 140 or cloth 150 attracts dust or dirt from the surface of the display 116, thus improving the cleaning of the display 116.

The cleaning application 122 monitors the user as he cleans the surface of the display 116. The sensor(s) 118 detects the amount of pressure the user is exerting on the display 116 (e.g., how hard the user is pressing down). When the amount of pressure exerted by the user exceeds a threshold value then the cleaning application 122 alerts the user that he is exerting too much pressure. The alert can be an audio alert or a visual alert that is shown on the display 116. The sensor(s) 118 further tracks where the user is exerting pressure on the display 116. When the cleaning application 122 detects that the user is no longer exerting pressure on the display 116, then the cleaning application 122 determines if the user missed cleaning any portion of the display 116 (e.g., locations where the user did not exert pressure). When the cleaning application 122 determines the user missed portions of the display 116, then the cleaning application 122 alerts the user that the display 116 was not fully cleaned. The cleaning application 122 emphasizes the dirty areas of the display 116 (e.g., the areas that the user did not exert any pressure with the e-cloth 140 or cloth 150). The cleaning application 122 emphasizes the areas of the display 116 by highlighting, circling, change the coloring, outlining, or other emphasis to illustrate the portions of the display 116 that the user failed to clean. The cleaning application 122 alerts the user that they cleaned the entire surface of the display 116.

Figure 2A:
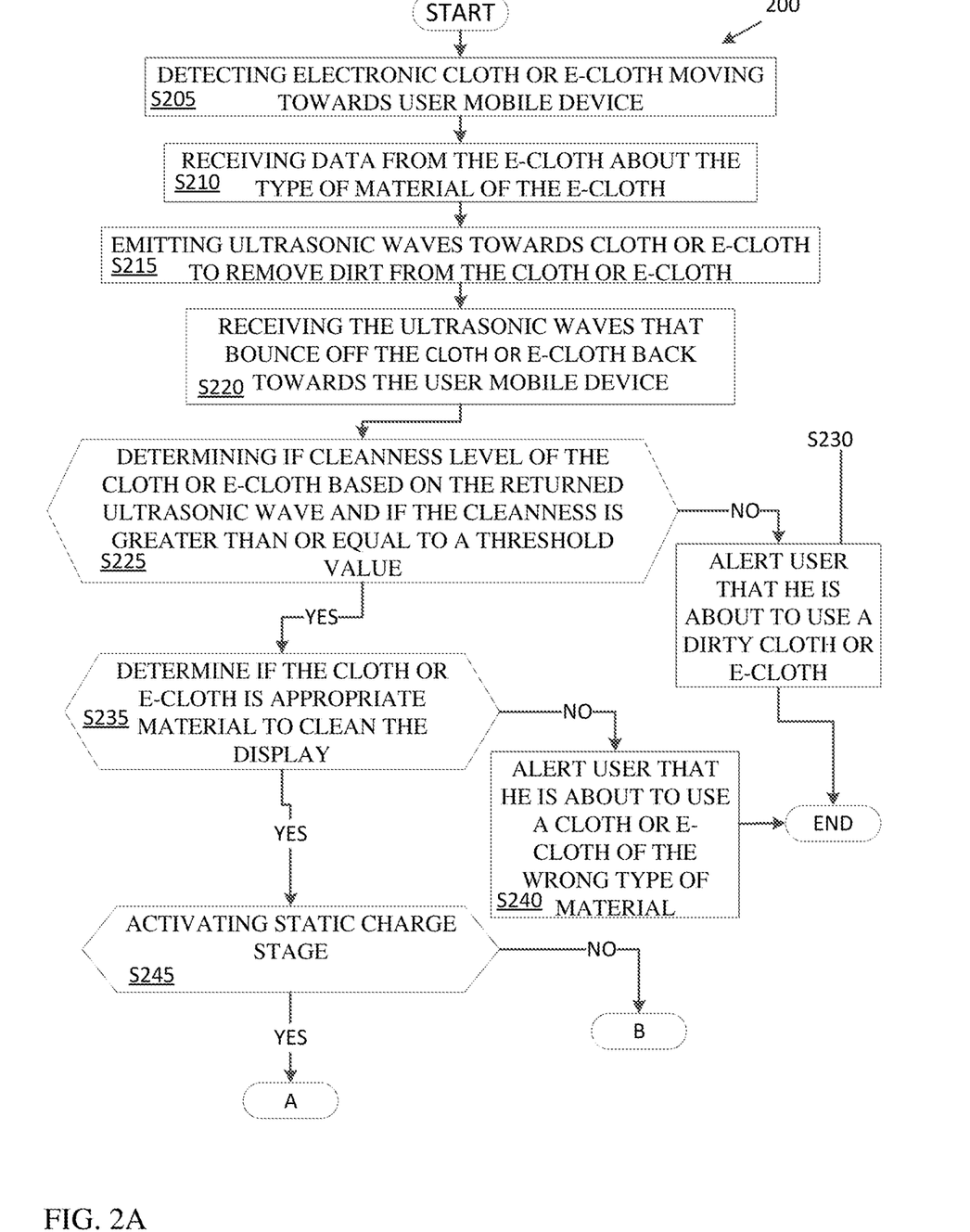
Figure 2B:
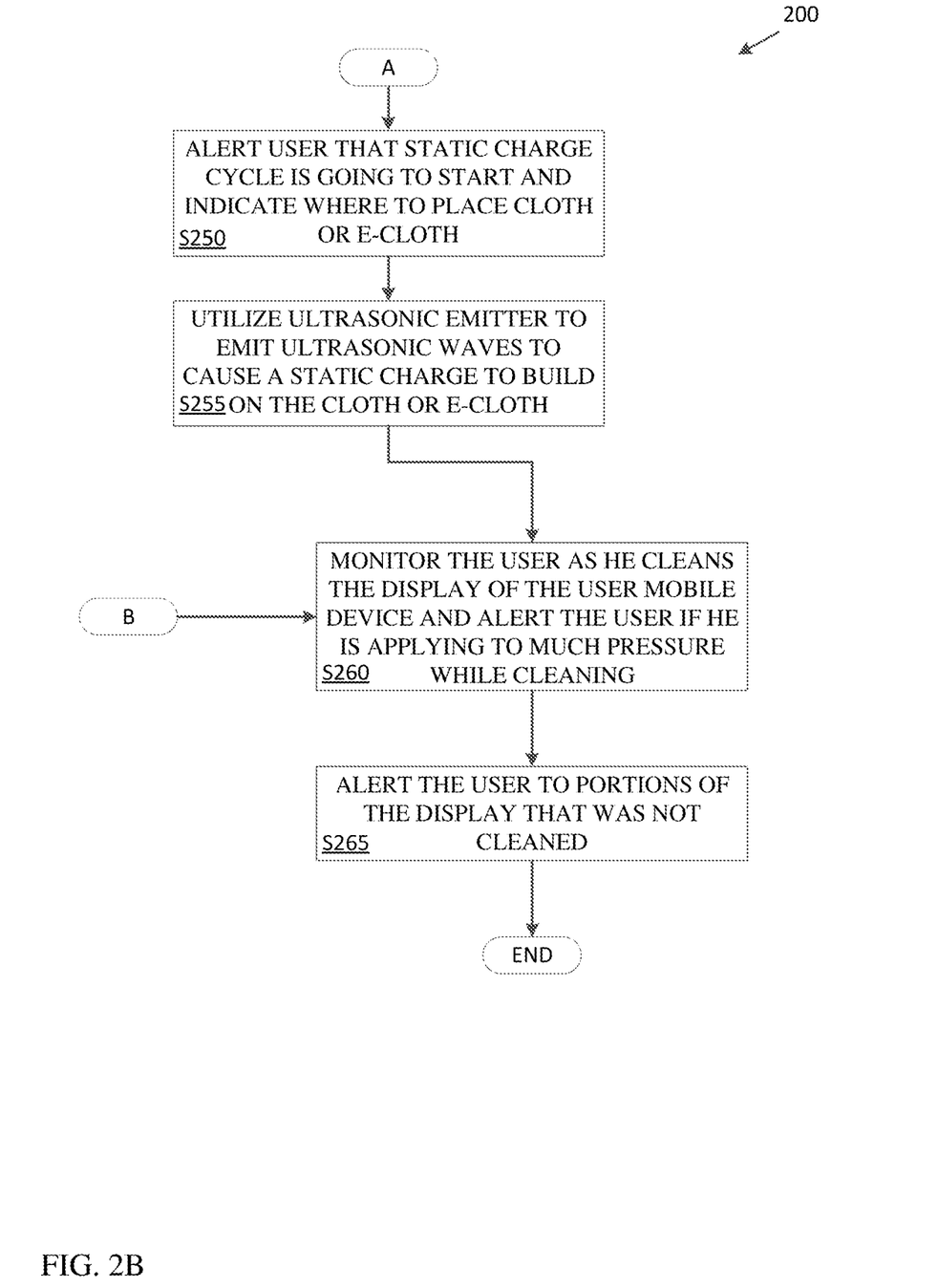

FIGS. 2A and 2B is a flowchart depicting operational steps 200 of the mobile device interaction with the electronic cloth of FIGS. 1A and 1B, in accordance with an embodiment of the present invention.

The sensor(s) 118 on the mobile device 110 detects a cloth 150 or e-cloth 140 approaching the display 116 (S205). When the user is using an e-cloth 140 to clean the display 116, then the mobile device 110 receives data from the e-cloth 140 (S210). The received data contains information about the material of e-cloth 140 (S210). The cleaning application 122 activates the ultrasonic emitter 120 to emit ultrasonic waves towards the cloth 150 or e-cloth 140 (S215). Dust and dirt on the surface of the cloth 150 or e-cloth 140 is removed by the impacting ultrasonic waves (S215). The ultrasonic waves are bounced back from the surface of the e-cloth 140 or cloth 150 towards the mobile device 110 (S220). The sensor(s) 118 on mobile device 110 detects the returning ultrasonic waves (S220). The cleaning application 122 determines the cleanliness level of the cloth 150 or e-cloth 140 based on the returned ultrasonic waves (S225). The cleaning application 122 determines if the cleanliness level of the cloth 150 or e-cloth 140 is greater than or equal to a threshold value (S225). When the cleanliness level is less than the threshold value, then the cleaning application 122 alerts the user that he is using a dirty cloth 150 or e-cloth 140 to clean the display 116 (S230). The alert can be an audio alert or a visual alert that is shown on the display 116 (S230).

When the cleanliness level of the cloth 150 or e-cloth 140 is greater than or equal to the threshold value, then the cleaning application 122 determines the type of material of the cloth 150 or e-cloth 140 (S235). The cleaning application 122 can determine the type of material (e.g., hard, or soft) of the e-cloth 140 from the data received from the e-cloth 140 (S235). Alternatively, the cleaning application 122 can compare the data from the returned ultrasonic waves to data stored in the cloth database 124 to determine the type of material (e.g., hard, or soft) of the cloth 150 or e-cloth 140 (S235). When the material of e-cloth 140 or cloth 150 is determined to be hard, then the cleaning application 122 alerts the user that he is about use the wrong type of material to clean the surface of the display 116 (S240).

The cleaning application 122 can determine that the e-cloth 150 can carry a static charge from the data received from the e-cloth 140 (S245). The cleaning application 122 can also give the user the option of activating the static charge stage (S245). The cleaning application 122 displays an alert on the display 116 indicating where to place the cloth 150 or e-cloth 140 for the static charge stage (S250). The cleaning application 122 activates the ultrasonic emitter 120 to emit ultrasonic waves towards the location where the cloth 150 or e-cloth 140 should be located (S255). The ultrasonic emitter 120 is operated for a predetermined period to allow a static charge to build up on the surface of the cloth 150 or e-cloth 140 (S255). While cleaning the surface of the display 116, the static charge on the cloth 150 or e-cloth 140 will attract the dust and dirt located on the surface of the display 116.

When there is no static charge applied to the cloth 150 or e-cloth 140 or when a static charge was applied to the cloth 150 or e-cloth 140 then cleaning application 122 monitors the user as he cleans the surface of the display 116 (S260). The sensor(s) 118 monitors the pressure the user exerts on the surface of the display 116 as he is cleaning (S260) and alerts the user if he exerts too much pressure on the surface of the display 116 (S260). The alert can be an audio alert or a visual alert that is shown on the display 116 (S260). The cleaning application 122 tracks where the user exerted pressure on the display 116 to determine the cleaned areas of the display 116 (S265). The cleaning application 122 alerts the user to portions of the surface of the display 116 that the user failed to clean (S265). The cleaning application 122 can highlight, circle, change the coloring, or other emphasis to illustrate the portions of the display 116 that the user failed to clean (S265).

Figure 3:
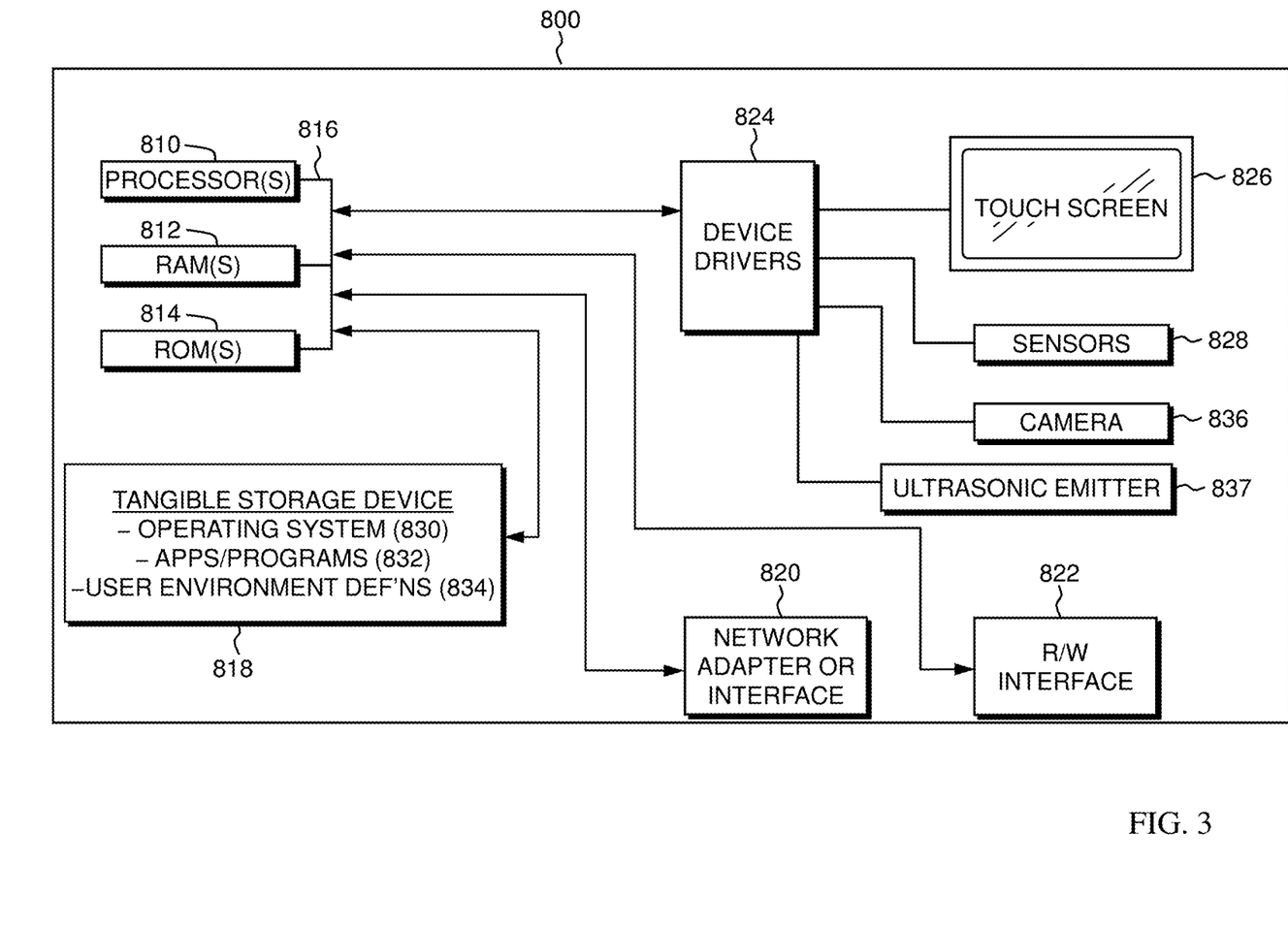

FIG. 3 is a block diagram of components of the mobile device 110 represented by telephone computing device 800 for invoking a user environment based on a device cover, in accordance with an embodiment of the present invention. In an exemplary embodiment, telephone computing device 800 includes one or more processors 810, one or more computer-readable RAMs 812, one or more computer-readable ROMs 814, and one or more computer-readable tangible storage devices 818 on one or more buses 816. One or more operating systems 830, one or more apps or programs 832, for example, message applications 140 and 160, and one or more user environment definitions 834 are stored on the one or more computer-readable tangible storage devices 818 for execution by one or more of the processors 810 via one or more of the RAMs 812 (which typically include cache memory). In the illustrated embodiment, each of the computer-readable tangible storage devices 818 is a semiconductor storage device such as ROM 814, EPROM, flash memory or any other computer-readable tangible storage device that can store a computer program and digital information. Alternatively, each of the computer-readable tangible storage devices 818 is a magnetic disk storage device of an internal hard drive.

Telephone computing device 800 also includes a read/write (R/W) interface 822, for example, a USB port, to read from and write to external computing devices or one or more portable computer-readable tangible storage devices such as a CD-ROM, DVD, memory stick, magnetic disk, optical disk, or semiconductor storage device. The apps and programs 832 and the user environment definitions 834 can be stored on the external computing devices or one or more of the portable computer-readable tangible storage devices, read via the R/W interface 822 and loaded onto the computer-readable tangible storage device 818.

Telephone computing device 800 also includes a network adapter or interface 820, such as a TCP/IP adapter card or wireless communication adapter (such as a 4G wireless communication adapter using OFDMA technology). The apps and programs 832 and the user environment definitions 834 can be downloaded to telephone computing device 800 from an external computer or external storage device via a network (for example, the Internet, a local area network, a wide area network, or a wireless network) and network adapter or interface 820. From the network adapter or interface 820, the apps and programs 832 and the user environment definitions 834 are loaded into computer-readable tangible storage device 818. The network may comprise copper wires, optical fibers, wireless transmission, routers, firewalls, switches, gateway computers and/or edge servers.

Telephone computing device 102 also includes a touch screen 826, a camera 836, sensors 828, ultrasonic emitter 837 for example, touch screen sensors and magnetically sensitive circuits, and device drivers 824 to interface to touch screen 826 for imaging, to sensors 828 for pressure sensing of alphanumeric character entry and user selections and for detecting magnetic flux and polarity. The device drivers 824, R/W interface 822 and network adapter or interface 820 comprise hardware and software (stored in computer-readable tangible storage device 818 and/or ROM 814).

It should be appreciated that FIG. 3 provides only an illustration of one implementation and does not imply any limitations regarding the environments in which different embodiments may be implemented. Many modifications to the depicted environment may be made.

Figure 4:
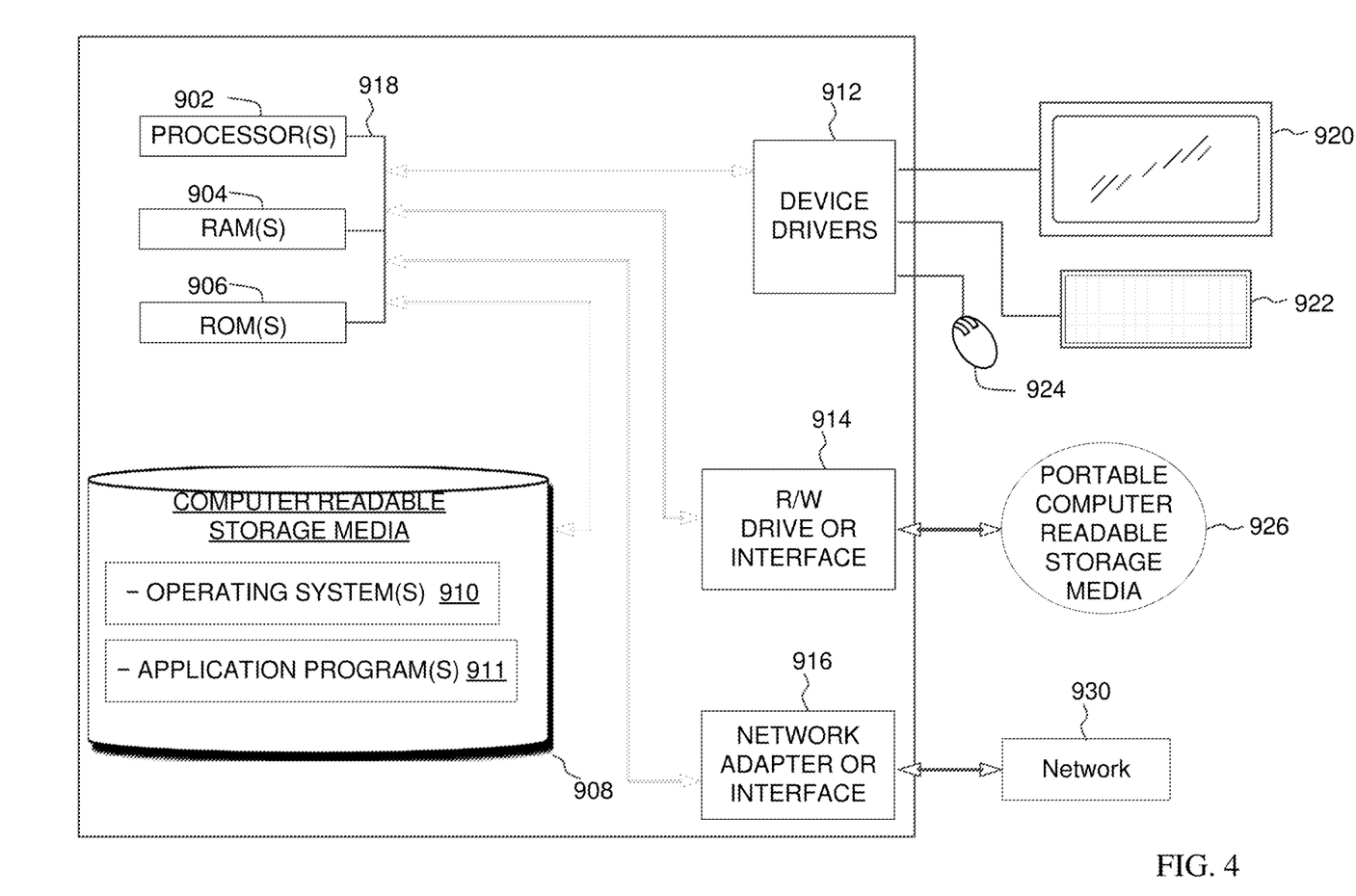

FIG. 4 depicts a block diagram of components of mobile device 110 of FIG. 1, in accordance with an embodiment of the present invention. It should be appreciated that FIG. 4 provides only an illustration of one implementation and does not imply any limitations regarding the environments in which different embodiments may be implemented. Many modifications to the depicted environment may be made.

Mobile device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, for example, cleaning application 122 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Mobile device 110 may also include a R/W drive or interface 914 to read from and write to one or more portable computer readable storage media 926. Application programs 911 on mobile device 110 may be stored on one or more of the portable computer readable storage media 926, read via the respective R/W drive or interface 914 and loaded into the respective computer readable storage media 908.

Mobile device 110 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on mobile device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Mobile device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cleaning application 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A mobile device comprising:
   a display;
   a first sensor to detect a cloth approaching a surface of the display;
   an ultrasonic emitter to emit ultrasonic waves towards the cloth;
   a second sensor to track a pressure a user exerts on the surface of the display; and
   a processing unit to: determine if the material of the cloth is hard or soft;
   in response to the material being hard, alert the user that the cloth is not appropriate to clean the surface of the display;
   and
   alert the user that the entire display was not cleaned with the cloth.

2. The mobile device of claim 1, further comprising:
   a third sensor to detect ultrasonic waves that bounced back from the cloth towards the display; and
   wherein the processing unit determining if the material of the cloth is hard or soft comprises comparing the detected ultrasonic waves that bounced back to data stored in a database.

3. The mobile device of claim 1, further comprising:
   the processing unit alerting the user that he is exerting too much pressure on the surface of the display based on the tracked pressure.

4. The mobile device of claim 1, wherein the processing unit alerting the user that the entire display was not cleaned with the cloth comprises emphasizing areas of the surface of the display that the user did not exert pressure upon.

5. The mobile of claim 4, wherein emphasizing areas of the surface of the display comprises highlighting, circling, changing a coloring, or outlining an area of the surface that was not cleaned.

6. The mobile device of claim 1, further comprising:
   a communications unit to receive data about the material the cloth is comprised of from the cloth, wherein the cloth is an electronic cloth.

7. The mobile device of claim 6, wherein the processing unit determining if the material of the cloth is hard or soft comprises comparing the received data from the electronic cloth to data stored in a database.

8. The mobile of claim 1, wherein the processing unit activates a static charge generation stage, wherein the static charge generation stage comprises generating a static charge on the cloth prior to the user cleaning the surface of the display with the cloth.

9. The mobile of claim 8, wherein the generating the static charge on the cloth comprises:
   the processing unit alerting the user to place the cloth at a predetermined location; and the ultrasonic emitter emitting ultrasonic waves toward the predetermine location, wherein the ultrasonic waves cause a static charge to build up on the surface of the cloth.

10. The mobile device of claim 9, wherein the processing unit alerts the user that the generation of the static charge has been completed.

\* \* \* \* \*